No. 706,793. Patented Aug. 12, 1902.
H. S. BAILEY & W. E. WILD.
ORE CONCENTRATOR.
(Application filed Feb. 20, 1902.)
(No Model.) 5 Sheets—Sheet 3.

No. 706,793. Patented Aug. 12, 1902.
H. S. BAILEY & W. E. WILD.
ORE CONCENTRATOR.
(Application filed Feb. 20, 1902.)
(No Model.) 5 Sheets—Sheet 4.

UNITED STATES PATENT OFFICE.

HOWARD S. BAILEY AND WILLIAM E. WILD, OF DENVER, COLORADO.

ORE-CONCENTRATOR.

SPECIFICATION forming part of Letters Patent No. 706,793, dated August 12, 1902.

Original application filed February 14, 1901, Serial No. 47,315. Divided and this application filed February 20, 1902. Serial No. 94,975. (No model.)

*To all whom it may concern:*

Be it known that we, HOWARD S. BAILEY and WILLIAM E. WILD, citizens of the United States of America, residing at Denver, in the county of Arapahoe and State of Colorado, have invented certain new and useful Improvements in Ore-Concentrators; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in ore-concentrators.

We provide a reciprocating or concentrating table in which a bed of ore-pulp is temporarily confined in the head end of the table until the mineral particles have stratified and settled, the table being provided with a washing portion for the concentrates below the pulp-holding portion. A transverse series of diagonal dams or ridges extends across the table to confine a constantly-changing bed of ore-pulp in the upper or reservoir portion until the mineral particles have had time to stratify and settle out of the current of ore-pulp flowing into and across the reservoir portion. Each longitudinal concentrating portion or surface comprises two sections of different depth and pitch, which extend from the ends of the table to the dam, being so arranged that the mineral particles are stratified and settled out of the pulp in one section and guided by the dam onto the other section. Each concentrating portion is intended to effect in and by itself a complete and perfect separation of mineral particles from the ore-pulp that flows into and across it and to wash and discharge its concentrates from it in one direction and its tailings in another direction, the concentrates settling out in the reservoir-section being forced to travel up the dam or incline between the two sections to reach the surface of the other section. The arrangement is such that the concentrates are forced to move in a substantially opposite direction from that in which the ore-pulp and tailings flow across the table.

Referring to the accompanying drawings.

Similar characters of reference refer to similar parts throughout the several views.

Referring to the drawings, the numerals 1 and 2 designate the side pieces of the frame of the main or top table of our ore separator and concentrator; 3, the head end rail.

44 designates the discharge-chute, which has two downwardly-inclined bottom portions 4 and 5, that extend at a downward slope from an apex 6, which is located at a predetermined point in the width of the discharge end.

Figure 1:
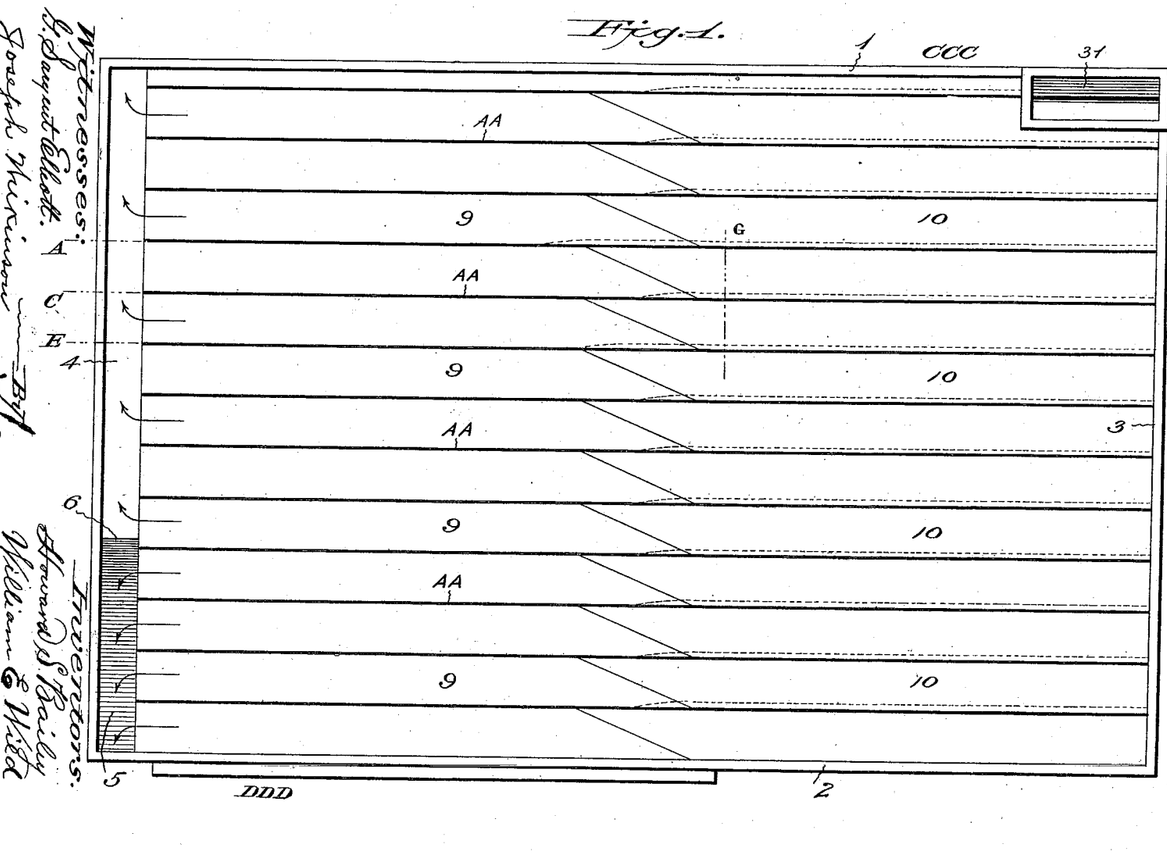
Figure 1 is a plan view of a concentrating-table embodying our invention.
Figures 2, 11:
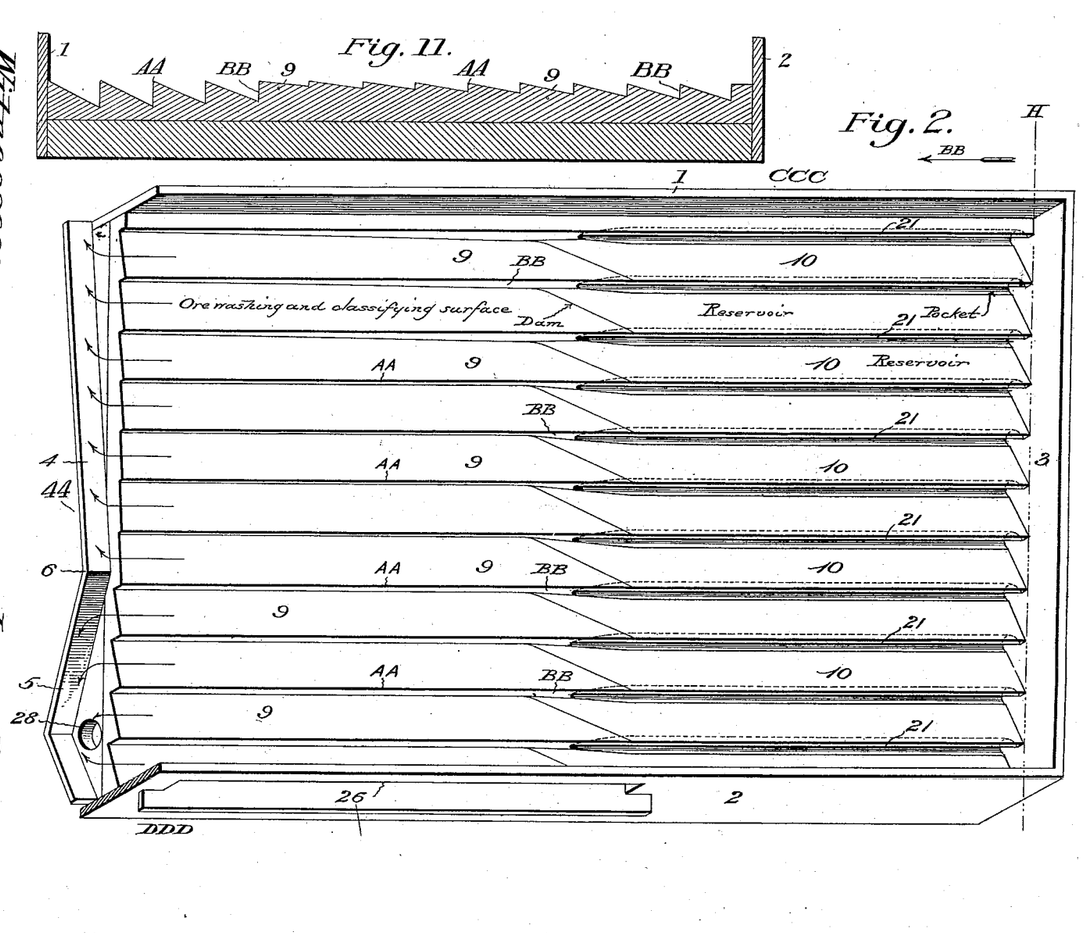
Fig. 2 is a perspective view showing a slightly-different arrangement of the concentrating-surfaces.
Fig. 11 is a transverse section on line 11 11 of Fig. 3.
Figure 3:
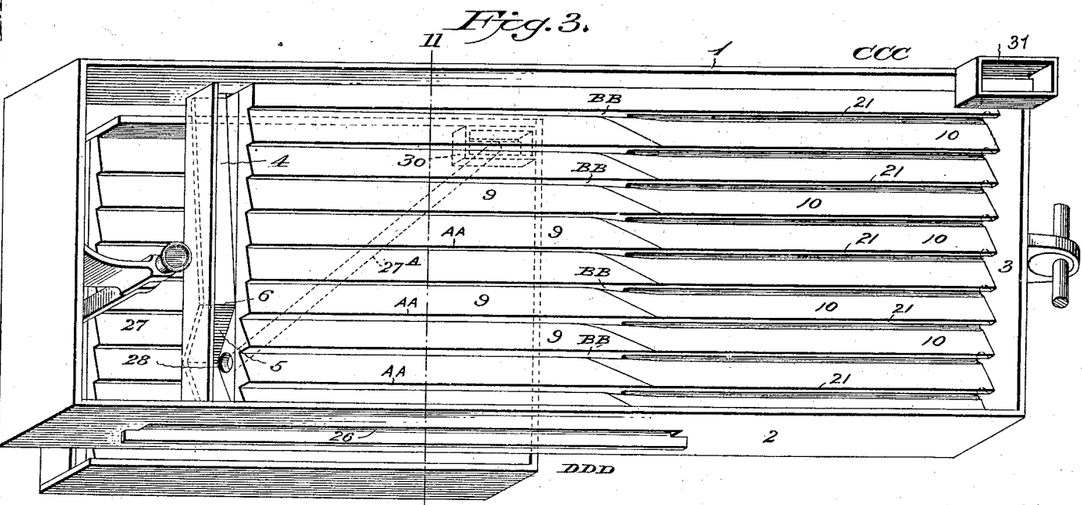
Fig. 3 is also a perspective view showing a middlings-table suspended below the main table.
Figure 4:
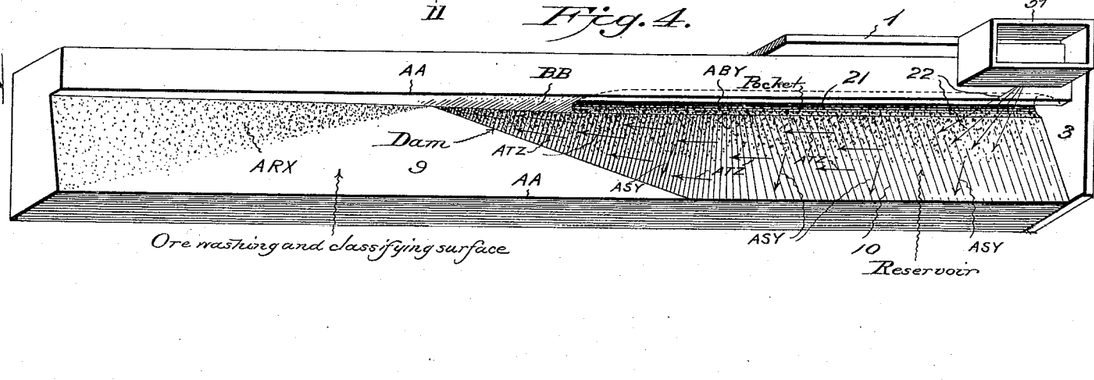
Fig. 4 is a perspective view of a single concentrating-surface and shows a perfect and complete concentrator, as this concentrating-surface contains in itself all of the elements necessary to effect perfect stratification and settlement and complete separation and concentration of the mineral particles in the ore-pulp.
Figure 5:
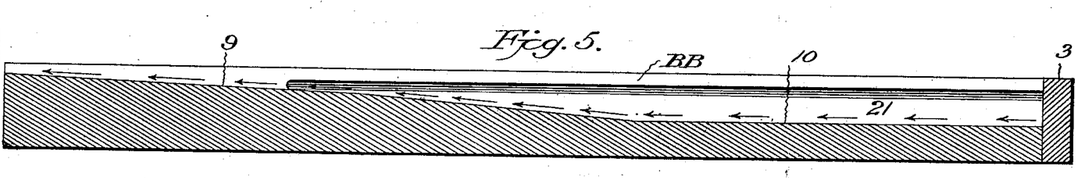
Fig. 5 is a sectional view on line A of Fig. 1.
Figure 6:
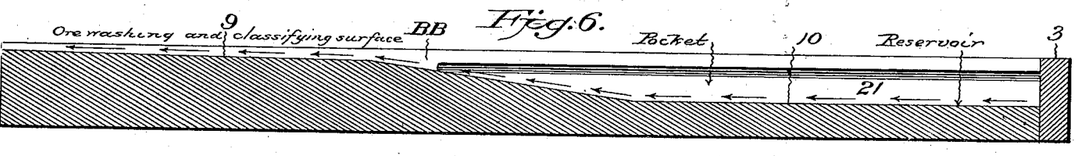
Fig. 6 is a sectional view of an independent concentrating-surface on line C in Fig. 1.
Figure 7:
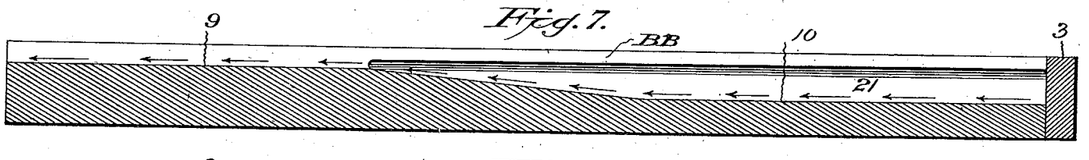
Fig. 7 is a sectional view of an independent concentrating-surface on line E in Fig. 1.
Figure 8:
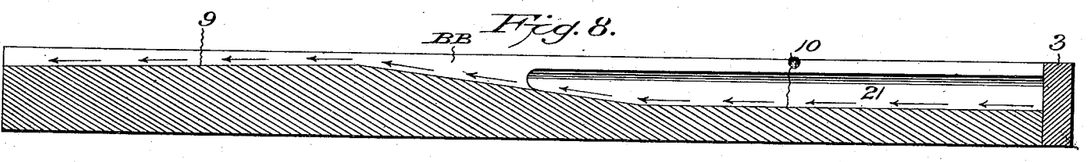
Fig. 8 is a sectional view of an independent concentrating-surface on line F in Fig. 10.
Figure 9:
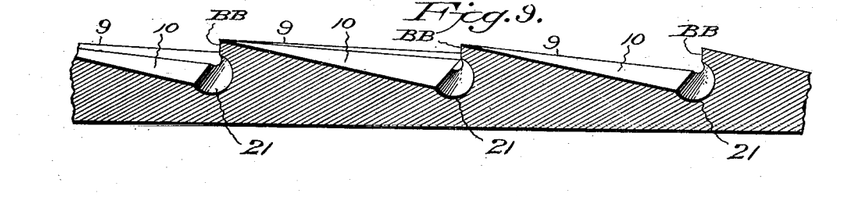
Fig. 9 is an enlarged and substantially full-size cross-sectional view on line G of Fig. 1 and shows the difference in vertical height or the amount of difference in the horizontal levels of the two inclined stepped sections of different pitches of each concentrating-surface and also shows that the concentrates A B Y must travel from the bottom of the pocket of the reservoir-section and from the bottom of the reservoir-section up the inclined surface or reservoir-face of the dam in order to get on top of the ore-classifying section.
Figure 10:
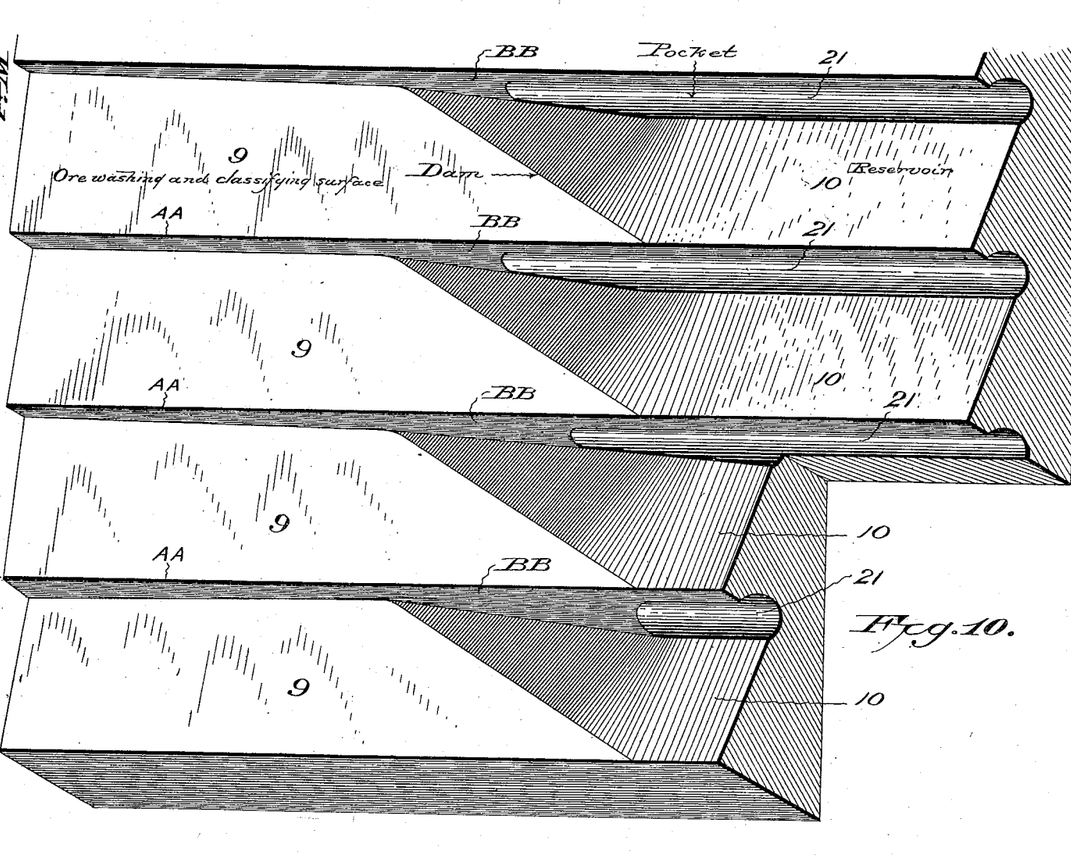
Fig. 10 is a perspective fragmentary sectional view of several independent concentrating-surfaces.

Our table consists of a plurality of concentrating-surfaces, each one of which is independent of the others; but in order to get a wide table that will have a large capacity we arrange a plurality of these concentrating-surfaces side by side. In Fig. 4 we show one of our independent concentrating-surfaces. This concentrating-surface is a complete concentrator in itself. This concentrating-surface is preferably about two inches wide by about sixteen feet long and comprises the two stepped inclined end-to-end sections 9 and 10, which intersect each other diagonally in such a manner that the section 9 forms a dam across the section 10. These two intersecting sections are arranged at different horizontal levels; but the line A A, which is the top edge of both sections, extends in a continuous unbroken line or edge from one end of the table to the other and forms the discharge side of the entire concentrating-surface, while the step and wall B B form the feed side of the head end portion of each reservoir portion of the concentrating-surface and at the ore-classifying section, in conjunction with the inclined bottom of that section, a path for the concentrates that allows those concentrates that settle on its surface to be guided in a substantially longitudinal line from each dam along the section of that particular concentrating-surface to the end of the table. The section 10 is made in full-size operative tables, preferably from one-quarter to three-quarters of an inch deeper than the section 9. The section 10 we preferably call the "reservoir-section," because the dams make of this section a reservoir and practically close it, except a narrow passage at its feed side. This section extends preferably straight from the head end rail a predetermined distance and then slopes upward, as shown in the sections 5, 6, 7, and 8. The inclined slope of the bottom of the reservoir to the top edge of the dam may be a straight incline or may be a twisted or warped surface extending from the bottom of the dam portion of the section 10 to the top of the dam. The section 9 is made in various forms, and it starts at the discharge end at an incline and may be given a gradual downward twist or warp or a spiral twist along the feed side of the concentrating-surface, as shown in Fig. 5, until it terminates in the dam, which also inclines slightly downwardly, as shown in the three sections at the feed side of Fig. 2, or, if preferred, these sections 9 may be made a straight or substantially a straight inclined stepped surface. In the side wall of the reservoir-section a pocket 21 is formed. We make these pockets of different lengths, sometimes extending them from the head end of the table along the bottom of the reservoir and up the upward slope of the dam and by the dams, but generally prefer to stop these pockets opposite the dams and to make them all of equal lengths, with their terminal ends at right angles to the length of the table. The pocket extends into the wall of the reservoir-section enough to enable any material that settles in it from the reservoir to be out of reach of the action of the current of the forward-flowing ore-pulp, which flows in the direction of the arrows 22 into the reservoirs, filling them full, and then flows across them over the bed of ore-pulp that settles in them and fills them and keeps them full. Now in order to form a concentrating-table of large concentrating capacity we group a number of these independent concentrating-surfaces together side by side, but in such a way that each is in all respects as independent of the others in its stratification and settlement and separation and concentration of the mineral particles from ore-pulp as is the concentrating-surface shown in Fig. 4. We therefore arrange side by side in table form preferably about from twenty-eight to thirty-two of these independent concentrating-surfaces. We preferably make them with reservoir-sections, dams, washing and classifying sections and pockets, respectively, of uniform dimensions, and the several sections or parts of the plurality of concentrating-surfaces are preferably arranged at right angles to the length of the table, as shown in all the figures that represent a group of these concentrating-surfaces. In arranging a plurality of these narrow concentrating-surfaces in a group to make a large concentrating-table we preferably arrange the ore washing and classifying sections deeper at the feed side C C C of the table and arrange each ore washing and classifying surface below it toward the tailings side D D D of the table until we arrive opposite or in a longitudinal line with the apex of the discharge-chute, where the ore washing and classifying sections are made much deeper than at any portion of the table and may be made, if desired, deeper and deeper from the apex 6 to the tailings-discharge side of the table, as shown in Fig. 2. This construction appears in Fig. 11, where the depth of the washing and concentrating surfaces is shown as gradually decreasing from the feed side up to the apex, below which the sections are much deeper, while gradually increasing in depth to the tailings side. These deep inclined sections are used to carry the middlings, which are tailings and concentrates mixed together, off the tables. In the full-size machines we make the sections 9 of the concentrating-surfaces that are between the apex of the discharge-chute and the tailings side of the machine from one-quarter of an inch to three-eighths of an inch deep. They are made that deep especially to catch and hold all the heavy particles in the tailings and convey them and discharge them into the chute 5 at the end of the table, from which they are lead to another table, as these middlings must either be reconcentrated or allowed to run to waste. The light tailings matter, however, that flows from the ore-pulp in the reservoirs and from the dams flows through the slot 26 in the side rail 2. Under the top or main table we suspend in an operative manner a middlings-table 27, which is in every respect like the top or main table, and consequently does not need to be described here. In the side wall of the chute 5 an aperture 28 is formed, to which one end of a pipe or trough 27^A is secured, which extends to the opposite diagonal corner of the middlings-table to a feed-box 30, which is shown in dotted lines, from which the middlings are distributed onto the head end and feed-side corner of the middlings-table. The table should be mounted to be rapidly reciprocated with a short quick jerk movement that will tend to move the pulp toward the dams. This reciprocal movement should be variable and may vary from a throw of a quarter of an inch to an inch and a half, and means should be provided for flowing a supply of clear water onto the table along a predetermined portion of its feed side, and means should also be provided for adjustably tilting the table transversely and for adjusting the table in a longitudinal plane.

The stratification, separation, and concentration of the mineral particles in the ore-pulp are as follows, reference being had, first, to the single concentrating-surface shown in Fig. 4: The ore-pulp, by which we mean pulverized ore and water mixed into a flowing stream, flows from the feed-box 31 over the reservoir-section 10 in the direction of the arrows and fills the reservoir full, and under the reciprocating action of the table the ore-pulp flows toward the dam, which substantially stops its onward passage in a straight line and deviates it to the feed side of the concentrating-surface against the step B B, and as it is being constantly added to by the inward volume of pulp it overflows its side edge A A; but as the feed of the ore-pulp should be regulated to only the amount that can be properly concentrated the material that discharges over the side edge A A will be tailings, and the material that discharges over the top of the dam will also be tailings and will be very much clearer tailings than those that flow over the side edge A A. The mineral particles that are in the ore-pulp rapidly settle under the very rapid reciprocative action of the concentrating-surface and stratify and settle onto the inclined surface of the reservoir-section and work backward into the pocket in the direction of the arrows A T Z, this direction being substantially opposite to that in which the ore-pulp flows across the concentrating-surface. As the ore-pulp fills the whole reservoir-section, the mineral particles settle along its length and feed back into the pocket, along which and along the bottom of the reservoir they feed to the dam, and as the bottom of the reservoir is about one-half of an inch below the top of the ore washing and classifying surface the concentrates made in the reservoir have to feed and travel up the inclined surface of the bottom of the reservoir and of the pocket, as shown by the arrows A T Z, to the lower edge of the dam, where they feed by it onto the ore washing and classifying portion of the section 9 below the dam, where, owing to the incline of this section, the heavier mineral particles congregate mostly against the wall B B and the lighter mineral particles arrange themselves over its surface, according to the order of their specific gravities. The concentrates A R X contain a little tailings matter when they feed from the dam onto the ore washing and classifying surface, and a supply of clean water is provided along the feed side of the concentrating-surface at and below the dam, and the tailings matter is washed away from the concentrates, which are thus left clean, and under the reciprocal action of the concentrating-surface they feed along and drop off of its discharge end, while the tailings matter is washed over its edge A A. The concentrating action of a plurality of concentrating surfaces made up into a table is the same as of a single one; but of course the quantity of ore-pulp flowing onto the table will have to be sufficient to keep each reservoir full. It will be plainly seen that each reservoir makes its own individual concentrates and that each dam of each reservoir keeps the concentrates that its own individual reservoir makes from flowing into the dam or dams of the concentrating-surfaces below it, as the sloping or inclined surface of the bottom of the reservoir to the top of the dam of each reservoir causes them to feed toward the feed side B B of the reservoir and of the concentrating-surface to the lower end of the dams where they feed out after climbing up the incline of the reservoir onto each individual ore washing and classifying section 9 of each dam and reservoir of each individual concentrating-surface, as shown in Figs. 1, 2, 3, 4, and 11. In a table of these independent concentrating-surfaces the clear concentrates are made on that group of concentrating-surfaces that lie between the feed side C C C and the apex 6 of the discharge-chute, and the light gangue matter flows across the table and out of the tailings-discharge slot 26 in the side rail 2 of the table, while the middlings, which are the heavy particles of tailings matter and of the ore-pulp that is washed across the top of the reservoirs by the steady flow of an abundance of the ore-pulp, lodges in the deep inclined sections 9 between the apex 6 and the tailings-discharge side D D D of the table and drop into the chute 5 and are reconcentrated on the middlings-table below in the same manner as on the main table.

The concentrating-table is provided with any preferred means for supplying water and effecting transverse tilting and longitudinal adjustment.

This application is in part a division of our earlier case, Serial No. 47,315, filed February 14, 1901.

Having described our invention, what we claim as new, and desire to secure by Letters Patent, is—

1. In an ore-concentrator, a reciprocating table containing a plurality of ore-pulp-receiving recesses of equal lengths, width and depth, a plurality of ridges or dams extending across said ore-pulp-receiving recesses, also of equal lengths, a plurality of concentrates washing and classifying portions below said dams, also of equal lengths, the said recesses and the said dams being arranged in a line at right angles to the length of the table, and means for feeding ore-pulp into and across said recesses, substantially as described.

2. In an ore-concentrator, a reciprocating table containing a plurality of ore-pulp-receiving reservoirs of equal lengths in the head-end portion of the table and of predetermined breadths and depths, a plurality of ridges or dams of equal lengths extending across said ore-pulp-receiving reservoirs, a plurality of concentrates washing and classifying portions below said ridges or dams, also of equal lengths, the said reservoirs and dams being arranged in a line at right angles to the length of the table, and means for conveying the concentrates from each of said reservoirs to each concentrates washing and classifying portion below said ridges and dams, means for feeding ore-pulp into and over said reservoirs, and means for tilting said table, substantially as described.

3. In an ore concentrator and separator, a reciprocating concentrating-table provided with a plurality of concentrating-surfaces of equal lengths from one end of the table to the other, in step form, each step comprising inclined surfaces intersecting at points intermediate of the ends of the steps, the said points of intersection forming dams arranged in a line at right angles to the length of the table, substantially as described.

4. In a reciprocating ore concentrator and separator, a table having a concentrating-surface comprising a plurality of concentrating-surfaces of equal lengths, in stepped form, each stepped surface comprising warped inclined surfaces intersecting each other at a point intermediate of the length of the step and each step being provided with a pocket in its vertical wall, substantially as described.

5. In an ore-concentrator, a reciprocating table comprising a plurality of separating portions of equal lengths in stepped relation, each separating-step comprising inclined warped surfaces intersecting each other at a point intermediate of the length of the step, the portion of the surface near the discharge end being inclined, and the series of intersections being arranged in a line at right angles to the length of the table, substantially as described.

6. In an ore-concentrator, a reciprocating table composed of a succession of separating portions of equal lengths in stepped relation, each portion comprising surfaces of different pitches intersecting each other in a line in such a manner as to form a dam intermediate the ends of the separating portions, the series of dams being arranged at right angles to the length of the table, substantially as described.

7. In an ore-concentrator, a reciprocating concentrating-table comprising a plurality of separating portions in stepped relation, each portion comprising surfaces intersecting each other on a line to form a dam on said separating portions, a pocket extending into each wall between two separating portions and extending along the lower edge of each portion, the series of dams being arranged at right angles to the length of the table, substantially as described.

8. In an ore-concentrator, a reciprocating, concentrating-table comprising a group of independent separating portions of equal lengths, each portion comprising two curved inclined sections intersecting each other on a line oblique to the length of the table, the feed-section being inclined to form an uphill surface for the pulp or ore to travel over, a vertically-disposed wall between the highest edge of each portion and the lowest edge of the succeeding portion, each wall being provided with a pocket tapering toward the discharge-section and merging into the substantially horizontal surface with which the discharge-section is provided near the discharge end, the lines of intersection being arranged at right angles to the length of the table, substantially as described.

9. In an ore-concentrator, a reciprocating, concentrating-table comprising a plurality of independent, concentrating portions of equal lengths, each consisting of an independent concentrating-surface, the discharging-sections being inclined slightly at the discharge ends, the concentrating-sections being substantially straight at the feed end, and of equal lengths, and each section being upwardly curved to form ridges or dams intermediate of the length of the table, the said ridges or dams being of equal lengths, the concentrating portions being transversely inclined and being arranged in step relation, a wall between each portion and tapering pockets of each corner formed by said separating portions and walls, said pockets entering the face of each wall, the series of ridges or dams above mentioned extending across the table at right angles to its length and being adapted to retain a bed of ore or pulp in each concentrating-section and to guide the mineral of said ore into said pockets, substantially as described.

10. In a reciprocating, ore-concentrating table over which ore-pulp flows, a plurality of reservoirs, of equal lengths, in the head end portion of said table adapted to receive said ore-pulp, a plurality of ridges or dams of equal lengths arranged at the discharge-end portion of said table and arranged to intersect said reservoir portions, and a plurality of pockets or channels of equal lengths, one of said pockets in each of said reservoirs, arranged to receive the concentrates from said ore-pulp of said reservoirs and arranged and adapted to convey said concentrates from said reservoirs past said ridges, the series of reservoirs and dams being arranged at right angles to the length of the table, substantially as described.

11. In an ore-concentrator, a reciprocating concentrating-table embodying on its concentrating-surface a plurality of ore-pulp-receiving recesses extending from the head end of said table toward its discharge end, a plurality of ridges at some distance from the discharge end of said table arranged to intersect said ore-pulp-holding recesses in a diagonal line in such a manner as to form dams across them and arranged to make of said recesses ore-pulp-holding reservoirs, and a pocket or channel in said recesses or reservoirs extending past said dam and arranged to blend into portions of said table beyond the dams formed by said ridges, the said ridges and reservoirs being all of equal lengths and arranged in a series at right angles to the length of the table, substantially as described.

12. In an ore-concentrator, a reciprocating table containing a plurality of ore-pulp-receiving recesses of uniform depth for a portion of their length from the head end of the table and of decreasing depth the rest of their length, the bottoms sloping upwardly to form diagonal ridges with the upwardly-sloping surfaces of discharge-sections which extend from said ridges to the discharge end of the table, and means for feeding pulp transversely over said series of recesses, the said reservoirs being of equal lengths and arranged at right angles to the length of said table, the said ridges being of equal lengths and arranged in a series at right angles to the length of the table, and the said discharge-sections also being of equal lengths, substantially as described.

13. In an ore-concentrator, a reciprocating table containing a plurality of recesses of equal lengths extending longitudinally of said table and of uniform depths for a predetermined portion of their lengths, and gradually decreasing in depth by an upward slope on diagonal lines of their bottoms the rest of their length, the said diagonal lines being arranged in a series at right angles to the length of the table, the intersection of said upwardly-sloping bottoms with the upwardly-sloping bottoms of discharging-sections extending from said recesses to the discharge end of said table forming diagonal ridges or dams extending across said recesses and a pocket in each channel arranged to convey the concentrates to the ridges that form said dams, substantially as described.

14. In an ore-concentrator, a reciprocating table having in its concentrating-surface a plurality of ore-pulp-receiving reservoirs of equal lengths extending longitudinally from the head of said table, a plurality of discharging-sections extending from the discharge end of the table to said reservoirs, also of equal lengths, the surface of said discharging-sections sloping upwardly to form diagonal intersecting dams across the ends of said reservoirs, a pocket in the side of each of said reservoirs extending at least to the said dams and the said dams being arranged in a series at right angles to the length of the table, substantially as described.

15. In an ore-concentrator, a reciprocating table comprising a plurality of inclined intersecting surfaces forming reservoir-sections of equal lengths at the head of the table, and discharge-sections extending from the discharge end of the table to the reservoir-sections, the surfaces of the discharge-sections being placed at a higher horizontal plane than those of the respective reservoir-sections, the surfaces of the reservoirs and discharge-sections being curved to different pitches to form dams at their intersections across the ends of the reservoirs, the said dams being arranged in a series at right angles across the table, and a passage in the side of each reservoir extending by the dam to the discharging-section, each reservoir and its dam being independent in its concentrating action of those reservoirs and dams above and below it and each reservoir and its dam being of a predetermined length, substantially as described.

16. In an ore-concentrator, the combination of a reciprocating table composed of a plurality of longitudinal concentrating-sections of equal length, each section comprising an ore-pulp-receiving portion and a concentrates washing and discharging portion, the respective portions intersecting each other to form a ridge or dam across the section at a point intermediate of its length, and a channel or pocket connecting the respective portions past said ridge or dam, substantially as described.

17. In an ore-concentrator, the combination of a reciprocating table composed of a plurality of concentrating-sections of equal lengths, each section being composed of two portions, the portion at the head end of the table being so inclined as to form a deep recess, and the other portion being inclined at a less depth to form a slight step; the intersection of the two inclined portions forming a diagonal ridge or dam, the said dams being arranged in a line at right angles to the length of the table, a tapering pocket extending along the side of the head portions of each section merging into the surface of the portion beyond the ridge, substantially as described.

18. In an ore concentrator and separator, a reciprocating, concentrating-table provided with a plurality of inclined concentrating-surfaces of equal lengths in step form, each comprising a reservoir-section and an ore washing and classifying section, said inclined surfaces intersecting at points intermediate of the ends of the steps, a ridge or dam portion at the point of intersection of said inclined surfaces of predetermined form, and a concentrates-passage connecting the reservoir-sections of said concentrating-surfaces with the ore washing and classifying section, substantially as described.

19. In an ore concentrator and separator a reciprocating, concentrating-table provided with a plurality of concentrating-surfaces of equal lengths in step form, each stepped concentrating-surface comprising an inclined reservoir-section and an inclined ore washing and classifying section, the said sections being arranged to intersect one another at points intermediate of the ends of the stepped concentrating-surfaces, a raised ridge or dam at the point of intersection, a concentrates-passage past the dam arranged to connect the lowest portions of the inclined surfaces with one another, a pocket in the lowest side of the inclined surface at and adjacent to the head end of the table blending into said concentrates-passage and having said dams arranged and adapted to guide the concentrates from the reservoir-section away from the dam below and in a substantially different direction from that in which the ore-pulp flows, and having said dams arranged across the table in any suitable direction substantially as described.

20. In an ore concentrator and separator a reciprocating, concentrating-table provided with a plurality of concentrating-surfaces of equal lengths in step form, each step comprising concentrating-surfaces of different inclination, a dam intermediate of the opposite ends of said concentrating-surfaces arranged to guide the concentrates away from the dam of the concentrating-surface below it, and a channel at the side of the dam nearest the feed side of the table arranged to connect said concentrating-surfaces on each side of the said dam, substantially as described.

21. In an ore concentrator and separator, a reciprocating, concentrating-table comprising a plurality of concentrating-surfaces of equal lengths, each concentrating-surface having an upward step or wall at one side and a downward step or wall at its opposite side, each concentrating-surface comprising an independent concentrating-surface consisting of two coöperating sections, a head-end section comprising an ore-pulp-holding reservoir, which extends from the head end of the table a predetermined distance toward the discharge end of the table, an inclined concentrates washing and classifying portion positioned above the bottom of said reservoir portion and extending from the discharge end of said table to said reservoir portion, a dam arranged to intersect and extend across said reservoir portion, and an upwardly-sloping inclined portion in said reservoir extending upward from its bottom adjacent to said dam to its top edge, a concentrates-passage from said reservoir past said dam, means for reciprocating said table, substantially as described.

22. In an ore-concentrator a reciprocating table comprising a plurality of riffles, a plurality of dams arranged across said riffles in such a manner as to close them at predetermined points and form of them ore-pulp-holding reservoirs, said dams being positioned at a predetermined distance from the head end of said table and commencing at the tailings-discharge side of said riffles and extending in a diagonal line toward the feed side of said riffles a predetermined distance, and a plurality of ore-washing portions below said dams, the said dams being arranged in a line at right angles to the length of the table, substantially as described.

23. In an ore concentrator and separator a reciprocating table comprising a plurality of stepped inclined concentrating-surfaces, each concentrating-surface being composed of two end-to-end sections of different inclined pitches arranged to intersect each other intermediate of their ends diagonally and having the diagonal line of intersection commencing at the head end and tailings-discharge side of each concentrating-surface, and extending toward the feed side of each inclined concentrating-surface, and having said diagonal lines of intersection arranged in a line at right angles to said table, substantially as described.

24. In an ore concentrator and separator a reciprocating table composed of a succession of separating-surfaces of equal length in stepped relation extending across the table from end to end, each concentrating-surface comprising end-to-end sections, one of which is a head-end reservoir-section, and the other an ore washing and classifying and discharge section, the said sections being of different pitches and arranged to intersect each other diagonally to form a dam across the head-end section, a passage by the feed side of each dam from one section to the other and having said intersecting dams arranged to commence at the head end and tailings-discharge side of said separating-surfaces, and extend diagonally toward their feed side and discharge end and having said dams arranged in a right-angle path across the table from the feed side to the discharge side of the table, substantially as described.

25. In an ore concentrator and separator, a reciprocating table composed of a plurality of concentrating-surfaces of equal lengths extending across the table from one end to the other, each surface being composed of sections of different pitches and arranged in end-to-end order and to form diagonally-arranged ridges or dams across one another, a pocket in one wall of one section of each end-to-end concentrating-surface, each dam being arranged from the head end and tailings-discharge side diagonally toward the feed side of each concentrating-surface and arranged one below the other in a line at right angles across the table, substantially as described.

26. In an ore-concentrator, a reciprocating table, containing a plurality of ore-pulp-receiving reservoirs of equal length, a plurality of dams extending across the ends of said reservoirs, a plurality of inclined ore washing and classifying portions of equal length extending from said dams to the discharge end of said table, a plurality of pockets arranged to convey concentrates from said reservoirs below said dams onto said ore washing and classifying portions, the said dams being each arranged diagonally from the head end and tailings side toward the feed side and discharge end of said table the position of each dam being such that the concentrates from each ore-pulp-receiving reservoir will be guided by its own individual dam away from the dam or dams below it to the feed side of its concentrating-surface and onto the feed side of its riffled ore washing and classifying portion below the dam and the tailings from each dam will flow clear ahead of all the dams below the second or third dam below it, substantially as described.

In testimony whereof we affix our signatures in presence of two witnesses.

HOWARD S. BAILEY.
WILLIAM E. WILD.

Witnesses:
G. SARGENT ELLIOTT,
JOSEPH WILKINSON.